US010007270B2

(12) United States Patent
Mazur et al.

(10) Patent No.: US 10,007,270 B2
(45) Date of Patent: Jun. 26, 2018

(54) REFERENCED VEHICLE CONTROL SYSTEM

(71) Applicant: LEICA GEOSYSTEMS AG, Heerbrugg (CH)

(72) Inventors: Chris Mazur, West Des Moines, IA (US); Adriaan Bakker, Zwaag (NL); Alexander Kurz, Hohenems (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 51 days.

(21) Appl. No.: 15/184,998

(22) Filed: Jun. 16, 2016

(65) Prior Publication Data
US 2016/0370805 A1 Dec. 22, 2016

(30) Foreign Application Priority Data
Jun. 16, 2015 (EP) ..................................... 15172394

(51) Int. Cl.
*G05D 1/02* (2006.01)
*E01C 19/00* (2006.01)
(Continued)

(52) U.S. Cl.
CPC ......... *G05D 1/0278* (2013.01); *E01C 19/004* (2013.01); *E02F 3/842* (2013.01);
(Continued)

(58) Field of Classification Search
CPC .......... G05D 1/0278; G05D 2201/0202; E02F 9/2054; E02F 3/842; E02F 9/262;
(Continued)

(56) References Cited

U.S. PATENT DOCUMENTS 8,098,367 B2 * 1/2012 Kirk ..................... G01C 15/002
356/141.4
8,400,351 B2 3/2013 Talbot et al.
(Continued)

FOREIGN PATENT DOCUMENTS

DE 10 2009 059 106 A1 6/2011
EP 2 006 448 A1 12/2008
(Continued)

OTHER PUBLICATIONS

European Search Report dated Nov. 23, 2015 as received in Application No. 15172394.

*Primary Examiner* — Jason Holloway
(74) *Attorney, Agent, or Firm* — Maschoff Brennan

(57) ABSTRACT

Some embodiments of the invention include a vehicle control system having: two GNSS receivers positioned fixedly in a known relationship with respect to one another on a vehicle, for receiving signals from navigation satellites, a computer unit for using the signals to form direction vectors, and generating instructions for steering the vehicle as a function of the direction vectors, wherein at least one retro-reflector is arranged in a predefined position with respect to the GNSS receivers on the vehicle, a geodetic measuring device is positioned in an immovable fashion at a known reference position in order to determine exact absolute positions of the retro-reflector, wherein the measuring device has a transmitter for transmitting the exact absolute positions to a receiver of the computer unit, and the computer unit is also designed to generate the instructions as a function of the exact absolute positions.

16 Claims, 2 Drawing Sheets

(51) Int. Cl.
  *G01S 19/41* (2010.01)
  *E02F 3/84* (2006.01)
  *E02F 9/22* (2006.01)
  *E02F 9/26* (2006.01)
  *G01S 19/25* (2010.01)
  *G01S 19/45* (2010.01)
  *E02F 9/20* (2006.01)

(52) U.S. Cl.
  CPC ............ *E02F 3/847* (2013.01); *E02F 9/2054* (2013.01); *E02F 9/2203* (2013.01); *E02F 9/225* (2013.01); *E02F 9/262* (2013.01); *E02F 9/265* (2013.01); *G01S 19/25* (2013.01); *G01S 19/41* (2013.01); *G01S 19/45* (2013.01); *G05D 2201/0202* (2013.01)

(58) Field of Classification Search
  CPC ......... E02F 3/847; E02F 9/265; E02F 9/2203; E02F 9/225; G01S 19/45; G01S 19/25; G01S 19/41; E01C 19/004
  See application file for complete search history.

(56) References Cited

U.S. PATENT DOCUMENTS

| | | | |
|---|---|---|---|
| 8,613,566 B2 | 12/2013 | Fritz et al. | |
| 8,794,868 B2 | 8/2014 | Fritz | |
| 9,002,565 B2* | 4/2015 | Jones | A01B 69/007 342/357.39 |
| 9,772,185 B2* | 9/2017 | Metzler | G01C 15/00 |
| 2002/0004691 A1* | 1/2002 | Kinashi | G01C 21/24 701/4 |
| 2006/0198700 A1* | 9/2006 | Maier | E01C 19/004 404/84.1 |
| 2009/0082992 A1* | 3/2009 | Green | G01C 15/002 702/152 |
| 2009/0222204 A1* | 9/2009 | Roberts | G05D 1/0259 701/470 |
| 2010/0215433 A1* | 8/2010 | Fritz | E01C 19/006 404/84.5 |
| 2011/0015817 A1* | 1/2011 | Reeve | G05D 1/0231 701/25 |
| 2011/0109915 A1* | 5/2011 | Buehlmann | G01C 15/002 356/614 |
| 2013/0162469 A1* | 6/2013 | Zogg | G01C 15/002 342/357.25 |
| 2014/0244208 A1* | 8/2014 | Paulsen | E01C 19/004 702/150 |
| 2014/0324291 A1* | 10/2014 | Jones | A01B 69/007 701/41 |

FOREIGN PATENT DOCUMENTS

| | | |
|---|---|---|
| WO | 2006/092441 A1 | 9/2006 |
| WO | 2009/055955 A1 | 5/2009 |
| WO | 2012/168186 A1 | 12/2012 |

* cited by examiner

REFERENCED VEHICLE CONTROL SYSTEM

FIELD OF THE INVENTION

The invention relates to a vehicle control system.

BACKGROUND

The vehicle control system according to the invention is provided for transportation machines and construction machines, in particular earth moving machines or traffic route construction machines. Such machines are used, for example, for road construction, particularly for fabricating water gullys, boundary walls, curb stones or road coverings. Material-removing and material-shaping machines such as caterpillar bulldozers, excavators, rotary cultivators and rollers, or transport machines such as feeding apparatuses and truck mixers are also intended to be equipped with the vehicle control system according to the invention.

In vehicle control systems having the specified applications, in particular precision in the positioning of the machine is required. The vehicle is guided according to a predefined route in dependence on determined actual position data.

In order to guide the machine along a predefined route and, if appropriate, also position its tools vertically, it is customary, inter alia, to extend a reference line, for example a wire cable, along which guidance takes place. This is carried out with distance sensors which are linked to the control system of the machine.

Since the scanning of the reference lines requires that the area to be worked is measured and staked out before the start of the installation works, and is therefore very costly, the machine can alternatively be controlled by means of a position determining system. For example, the position of the machine is determined by means of one or more GPS receivers which are arranged on it. However, the position data which is received by the navigation satellites contains an error or inaccuracy which is unacceptable depending on the use. The accuracy is usually greatly improved by virtue of the fact that what is referred to as a differential global positioning system (DGPS) is used. This makes use of the fact that the errors which occur at a specific point in time in the relatively close surroundings virtually correspond during the determination of the position. The GPS receivers in the machine therefore receive correction data which is acquired by means of a reference station at another location which is not too far away. The reference station is here a further GPS receiver, and the location is one whose position is exactly known. The position data received from the reference station is compared with the exactly known position, and a difference is determined between said positions and is communicated to the imprecise GPS receivers. This technology is described in terms of the generic type, for example, in U.S. Pat. No. 8,400,351 and DE 10 2009 058 106 A1, and requires not only complex and expensive equipment but also special knowledge on the part of specialist personnel.

An alternative form of positioning machines which is independent of satellites is also known, in which alternative, as described in EP 2 006 448 A1, the actual position of a reflector which is mounted on the vehicle and whose position is continuously measured by means of a tachymeter is compared with a reference position, for example from a model of the terrain, wherein control instructions are derived from the comparison. The disadvantage with this method is the continuous dependence of the control on the stationary tachymeter and a tracking mechanism (tracking) which is potentially susceptible to interference.

The specified position- or location-determining methods for performing control are developed for high levels of accuracy and require corresponding complex components and data processing methods. For this reason, only the machines which operate with an extremely high level of accuracy are controlled in this way.

SUMMARY

Some embodiments of the invention may make available a simplified, and therefore more user-friendly, vehicle control system.

Some embodiments of the invention may make available a vehicle control system with simplified referencing.

The subject matter of the invention is a vehicle control system which uses navigation GNSS signals (for example GPS signals or Glonass signals), but in this context without a GNSS reference station, and does not require GNSS localization or a GNSS coordinate system, and nevertheless provides an at least equivalent level of accuracy to that of a control system having a GNSS reference station. As a result, neither a complex GNSS transformation nor the use of specialist personnel with GNSS know-how is required either. This simplification also contributes to the fact that there can be saving in terms of time and costs at construction sites.

According to the invention, the vehicle control system has two GNSS receivers positioned fixedly in a known relationship with respect to one another on a vehicle, for receiving signals from navigation satellites, a computer unit (4) for using the signals to form direction vectors, and generating instructions for steering the vehicle as a function of the direction vectors, wherein at least one retro-reflector is arranged in a predefined position with respect to the GNSS receivers on the vehicle, a geodetic measuring device is positioned in an immovable fashion at a known reference position in order to determine exact absolute positions of the retro-reflector, wherein the measuring device has a transmitter for transmitting the exact absolute positions to a receiver of the computer unit, and the computer unit is also designed to generate the instructions as a function of the exact absolute positions.

A tachymeter, a laser tracker or a total station serves as a reference station at a location (for example at the edge of a construction site) with precisely known coordinates (for example GPS coordinates). This geodetic measuring device has means 7 for transmitting position data, for example by means of radio.

A construction vehicle has at least one reflector and two GNSS receivers (for example GPS antennas in a master/slave arrangement), wherein the spatial positions of said components relative to one another and relative to the vehicle are exactly known. For example, a plurality of reflectors can also be mounted on the construction vehicle, and this is for the case in which at least one reflector is always visible to the geodetic measuring device for reasons of perspective, wherein the different positions of the reflectors on the construction vehicle are likewise known and the reflectors have to be identifiable in this respect.

The GPS antennas serve here to determine the travel angles or travel vectors on the basis of which the direction of travel or orientation of the vehicle is determined. This is done by means of direct and combined evaluation in a computer unit which is located on the vehicle, but which can also be positioned apart from it using wireless data exchange. The computer unit can, for functional reasons, also be separated into two units, specifically a GPS receiver and a computer for calculating the data.

The referencing or absolute position assistance by means of said TPS reference station (for example total station) takes place at least initially and once, in particular continuously, in the possible scanning range of between 5 and 10 times per second, and this occurs in the figurative sense as a "support vector" for the GNSS direction vectors, or in other words: in order to supply highly precise absolute positioning for the GNSS antennas.

Depending on how the two GPS antennas are oriented on the vehicle, an inclination or gradient can be calculated from the altitude information and position information of the antennas. If, for example, the lateral inclination is of interest (for example important in the case of road construction on a bend), the antennas preferably lie in a line perpendicular to the (head-on) direction of travel or parallel to one of the vehicle axles.

According to a further embodiment of the invention, a referenced reflector position or vehicle position can subsequently serve even as a reference, or the vehicle having the reflector can serve as a reference station, by virtue of the fact that the position support data is passed on, in particular continuously, to other machines (for example by radio technology). A total station or a tachymeter can be available at a construction site for all the vehicles to be referenced, if said construction site is located at an exactly known position. However, it may be practical to pass on the position support data, where appropriate, in a network which is produced by the vehicles, instead of referencing each individual vehicle.

The GNSS support values can also be transmitted from vehicle to vehicle by just such TPS technologies, i.e. by total station/tracker and reflectors, wherein the spatial positions of these two components are known relative to the vehicles carrying them, and in particular also the orientations of the vehicles determined by the GNSS system are included in the calculation. A precondition for this is that the vehicles have the double GNSS antenna locating system according to the invention for determining orientations/directions.

The receiver of the computer unit can be designed to pass on correction data to receivers of other vehicles, wherein the correction data is formed from the difference between position data which is determined with the GNSS receivers, and the exact absolute positions which have been determined by means of the geodetic measuring device such as, for example, a total station or a tachymeter, and the retroreflector.

The computer unit can be additionally designed to generate instructions for the positioning and/or deployment of a tool mounted on the vehicle, such as, for example, a milling tool. The computer unit can also be designed to generate instructions for the positioning and/or deployment of a material feed device which is mounted on the vehicle, said feed device being, for example, for a road covering.

The computer unit can also be designed to generate instructions for driving the vehicle and therefore, for example, for the speed and/or acceleration of the vehicle. The brake system can also be analogously controlled by means of the computer unit.

The determination and transmission of the exact absolute positions by the computer unit can take place continuously.

The GNSS receivers are jointly positioned, for example, on a straight line which is parallel or perpendicular to the direction of straight-ahead travel or to the vehicle axle.

If the vehicle has at least one tool and/or one material feed device, at least one or more from the following list are stored on a data carrier of the computer unit: at least one actual 2-D model, at least one actual 3-D model, at least one reference 3-D model, at least one intermediate reference 3-D model, and working instructions with respect to a ground configuration. These models can be displayed to the driver of the machine, for example in the passenger cell, on a display which is connected to the computer unit. The 2-D model can provide the user of the vehicle with an overview as a map by displaying his location on the construction site. 3-D models can be displayed in the actual state and in the reference state. In particular, intermediate reference 3-D models can be displayed, for example, if a plurality of working steps are to be carried out. It is also possible for direct working instructions to be issued to the specialist operator via the display which is connected to the computer unit. The at least one model preferably contains geometric data in GNSS coordinates.

The invention also relates to a corresponding method for performing at least partially automated control of a vehicle, in particular of a construction machine, in which method two GNSS receivers which are positioned fixedly in a known relationship with respect to one another on the vehicle receive signals from navigation satellites, a computer unit continuously uses the signals to form direction vectors, a geodetic measuring device, which is immovable at a known reference position, determines exact absolute positions of a retro-reflector which is positioned on the vehicle in a known relationship with respect to the GNSS receivers, a transmitter of the measuring device transmits the exact absolute positions to the computer unit, and instructions for steering the vehicle are generated by the computer unit as a function of the direction vectors and the exact absolute positions.

An extension system according to the invention can be applied to and mounted on additional vehicles, said extension system having at least: two GNSS receivers, which are positioned fixedly in a known relationship with respect to one another on a said additional vehicle, for receiving signals from navigation satellites, a receiver for receiving correction data, and a computer unit for using the signals to form direction vectors and position data and to generate instructions to the steering system of the vehicle as a function of the direction vectors, of the position data and of the correction data.

The invention also relates to the use of two GNSS receivers, which are positioned fixedly in a known relationship with respect to one another on a vehicle, for receiving signals from navigation satellites, a receiver for receiving correction data, and a computer unit for using the signals to form direction vectors and position data and to generate instructions to the steering system of the vehicle as a function of the direction vectors, of the position data and of the correction data, as an extension system which can be applied to and mounted on an additional vehicle, for the vehicle control system described above.

BRIEF DESCRIPTION OF THE DRAWINGS

The devices according to the invention and the method according to the invention are described below in more detail purely by way of example on the basis of specific embodiments which are shown schematically in the drawings, wherein further advantages of the invention are also given. In particular.

DETAILED DESCRIPTION

Figure 1:
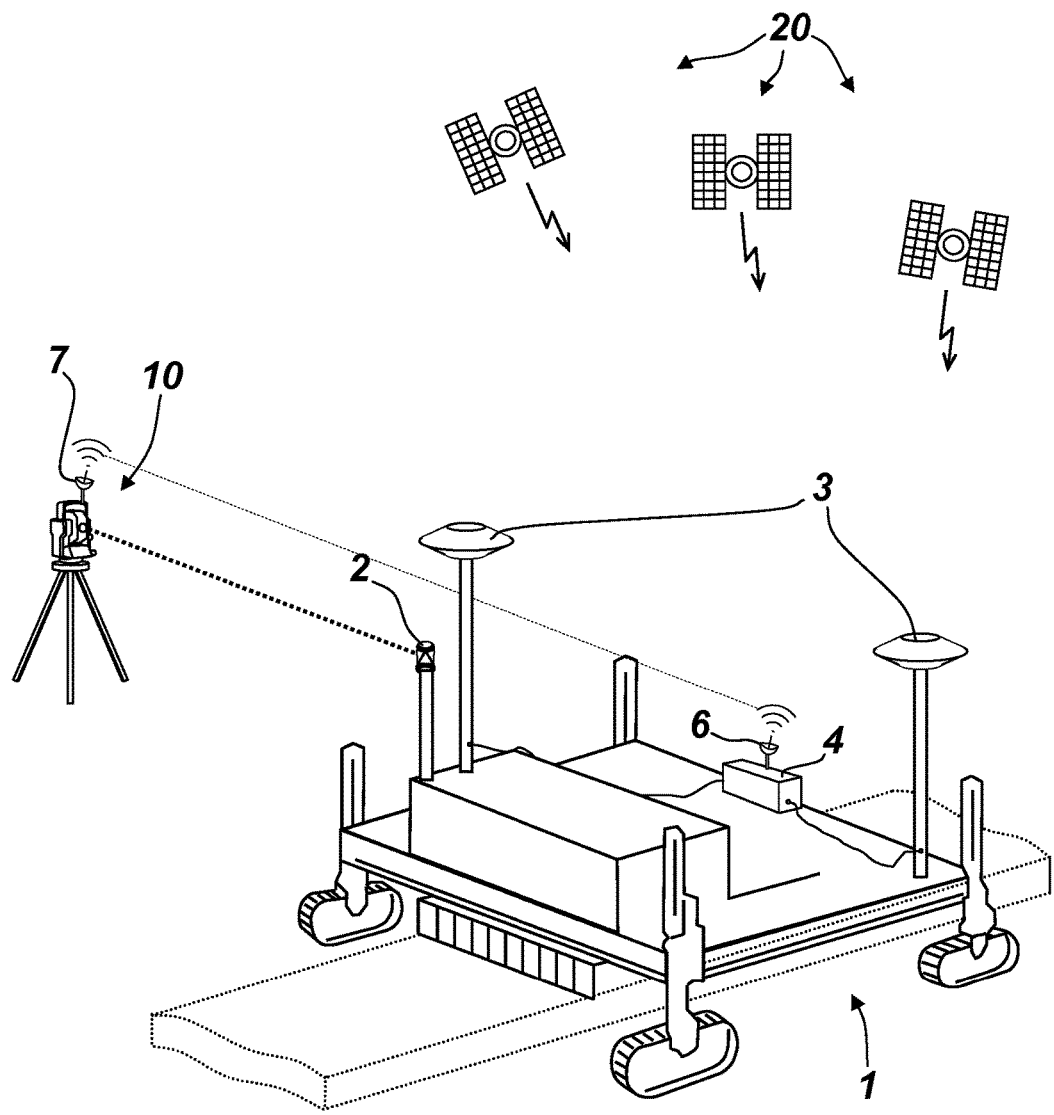
FIG. 1 shows a road construction machine with a reflector, two GNSS antennas and a computer unit.

FIG. 1 shows a scenario from the road construction, in particular a slipform paver 1, which is referenced by means of a total station 10 before the start of the work. The total station 10 is positioned here in a highly precise fashion at a known location, in particular with known GPS coordinates. Proceeding from this known location, the spatial position of the retro-reflector 2 can be determined in a highly precise fashion, said retro-reflector 2 being mounted at any desired location on the road finishing machine 1, for example at the end of a mast. Two GNSS antennas 3, for example GPS antennas, are located in a predefined spatial correlation to the retro-reflector 2 on the machine 1, said GPS antennas receiving signals from navigation satellites 20. The computer unit 4 which is connected to the GPS antennas 3 has
  information on the absolute spatial position of the total station 10,
  information on the spatial position of the GPS antennas 3 with respect to one another and relative to the vehicle 1,
  information on the spatial position of the retro-reflector 2 relative to the vehicle 1, and
  means for receiving information from the total station 10.

The total station 10 correspondingly has means for transmitting information to the computer unit 4. The information relates, in particular, to the high-precision spatial coordinates, determined by the total station 10, of the retro-reflector 2, the latter having their origin or basis in the precisely known position of the total station 10. The fact that the computer unit 4 has information on the absolute spatial position the total station 10 is optional precisely when the computer unit 4 does not receive any relative data, instead absolute data, relating to the position of the retro-reflector 2 from the total station 10 (origin). Either the absolute position of the retro-reflector 2 is thus communicated to the computer unit 4 or said computer unit 4 must firstly calculate said position from the stored information on the absolute spatial position of the total station 10 and the position of the retro-reflector 2, measured by the total station 10, relative to the total station 10.

The computer unit 4 also receives raw data (signals) from the GPS antennas 3 and processes it to form orientation data (angles and vectors).

The continuous tracking of the reflector 2 permits the direct determination of the absolute position of the vehicle control system, wherein the GNSS system (composed of at least the two antennas and the computer unit) continuously supplies orientation data.

Alternatively, an initial and single measurement or referencing process can also be carried out by means of the total station 10, wherein position data acquired by means of the GNSS antennas then carries on the position profile—instead of the continuous absolute referencing. This position data is then made more precise once on the basis of the referencing.

Figure 2:
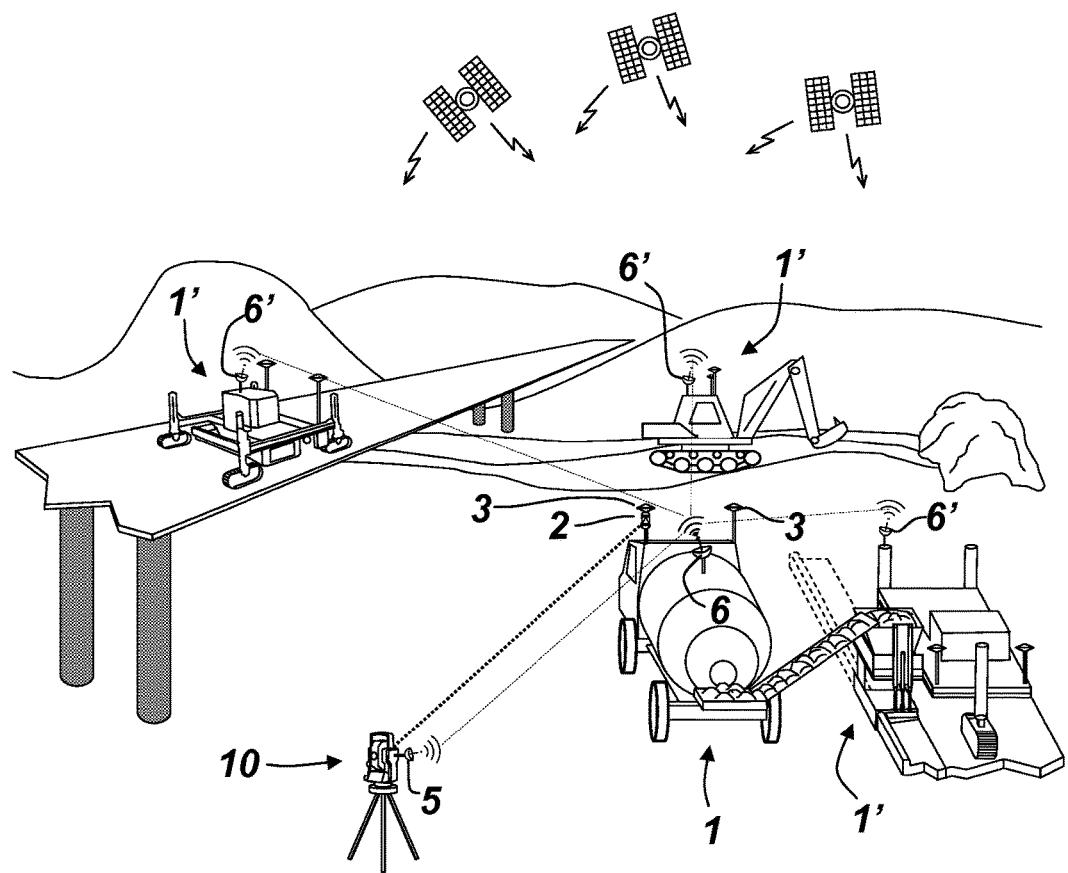
FIG. 2 shows a construction site scenario with various construction machines according to the invention.

FIG. 2 shows a construction site scenario with a plurality of different construction machines 1, 1'. The vehicle 1 which has the control system according to the invention can reference its absolute position in the described way by means of the total station 10. The vehicles 1', which do not have any retro-reflector 2 can, nevertheless, receive correction values via a communication system (support position data transmitter 5, receiver 6, wherein the receiver 6 also serves as a transmitter of correction data, and receiver 6') or some other cableless transmission, and this is done in the example shown by means of the machine 1, which calculates this correction data via
  the precise absolute position and
  by means of the "coarse" absolute position (subject to GNSS errors) determined at its positioned GNSS antennas 3.

The computer units 4 of the machines are not illustrated in FIG. 2.

It is a precondition for this exemplary embodiment of the invention that, in addition to the direction vectors, a (non-referenced) GNSS position is also determined by means of the GNSS antenna system on the machines 1 and 1'. In other words, a correction (position difference) is formed on the machine 1 (by means of a computer unit 4):
  of the (exact) absolute position of the reflector 2 determined by means of the total station 10, and
  of the (imprecise) position determined by means of the GNSS antennas 3 of the machine 1.

The communication system (6, 6') then exchanges only said GNSS correction with which the machines 1' can also be controlled automatically without TPS referencing.

Alternatively, the construction machines can also have measuring systems by means of which the positions of the construction machines relative to one another are determined. As a result, it is no longer necessary to determine an (imprecise) position by means of the GNSS antennas, but instead merely the absolute position (determined exactly with the geodetic measuring device) of the machine 1 is exchanged with all the further machines 1'.

Of course, the figures which have been shown and explained are only schematic illustrations of possible exemplary embodiments. In particular, it is to be noted that the examples which are explicitly illustrated and explained can, without exception, be used separately from one another as well as in any desired combination with one another, and can also be combined with corresponding devices and methods of the prior art.

What is claimed is:

1. A vehicle control system, comprising:
  two GNSS receivers positioned fixedly in a known relationship with respect to one another on a vehicle, the two GNSS receivers configured to receive signals from navigation satellites;
  a computer unit configured to:
    use the signals from navigation satellites to form direction vectors, and
    generate instructions for steering the vehicle based on the direction vectors,
  at least one retro-reflector arranged in a predefined position with respect to the GNSS receivers on the vehicle; and
  a geodetic measuring device positioned in an immovable fashion at a known reference position in order to determine exact absolute positions of the retro-reflector, wherein the measuring device has a transmitter for transmitting the exact absolute positions to a receiver of the computer unit; and
  wherein the computer unit generates the instructions as a function of the exact absolute positions.

2. The vehicle control system according to claim 1, wherein:

the receiver of the computer unit is designed to pass on correction data to receivers of other vehicles, wherein the correction data is formed from the difference between position data which is determined with the GNSS receivers, and the exact absolute positions.

3. The vehicle control system according to claim 1, wherein:

the computer unit generates instructions for the positioning.

4. The vehicle control system according to claim 1, wherein:

the computer unit generates instructions for deployment of a tool mounted on the vehicle.

5. The vehicle control system according to claim 1, wherein:

the computer unit generates instructions for deployment of a material feed device which is mounted on the vehicle.

6. The vehicle control system according to claim 1, wherein:

the computer unit generates instructions for driving the vehicle.

7. The vehicle control system according to claim 1, wherein:

the computer unit generates instructions for the brake system of the vehicle.

8. The vehicle control system according to claim 1, wherein:

the geodetic measuring device continuously determines and transmits the exact absolute positions.

9. The vehicle control system according to claim 1, wherein:

the GNSS receivers are jointly positioned on a straight line that is perpendicular to the direction of straight-ahead travel.

10. The vehicle control system according to claim 1, wherein:

the GNSS receivers are jointly positioned on a straight line that is parallel to the direction of straight-ahead travel.

11. The vehicle control system according to claim 1, wherein:

the GNSS receivers are jointly positioned on a straight line that is parallel to a vehicle axle.

12. The vehicle control system according to claim 1, wherein:

the GNSS receivers are jointly positioned on a straight line that is perpendicular to a vehicle axle.

13. The vehicle control system according to claim 1, wherein the vehicle has at least one tool and/or one material feed device, wherein:

one or more from the following group are stored in the computer unit:
at least one actual 2-D model,
at least one actual 3-D model,
at least one reference 3-D model,
at least one intermediate reference 3-D model, and
working instructions with respect to a ground configuration.

14. The vehicle control system according to claim 13, wherein:

the at least one model contains geometric data in GNSS coordinates.

15. A method for performing at least partially automated control of a vehicle, the method comprising:

receiving signals from navigation satellites using two GNSS receivers, the GNSS receivers being positioned fixedly in a known relationship with respect to one another on the vehicle;

continuously forming directional vectors from the signals using a computer unit;

determining exact absolute positions of a retro-reflector which is positioned on the vehicle in a known relationship with respect to the GNSS receivers using a geodetic measuring device that is immovable at a known reference position;

transmitting the exact absolute positions to the computer unit using a transmitter of the measuring device; and generating instructions for steering the vehicle by the computer unit based on the direction vectors and the exact absolute positions.

16. The vehicle control system according to claim 1, having an extension system which can be applied to and mounted on an additional vehicle, said extension system having at least:

two GNSS receivers, which are positioned fixedly in a known relationship with respect to one another on a vehicle, for receiving signals from navigation satellites;

a receiver for receiving correction data; and a computer unit for using the signals to form direction vectors and position data and to generate instructions to the steering system of the vehicle as a function
of the direction vectors,
of the position data, and
of the correction data.

* * * * *